US010805263B2

(12) United States Patent  
Kasimov et al.

(10) Patent No.: US 10,805,263 B2  
(45) Date of Patent: Oct. 13, 2020

(54) DOMAIN NAME REGISTRY DATABASE

(71) Applicant: UKCI Holdings Limited, Douglas (IM)

(72) Inventors: Ulvi Kasimov, London (GB); Suleyman Kasimov, London (GB)

(73) Assignee: UKCI Holdings Limited, Douglas (IM)

( * ) Notice: Subject to any disclaimer, the term of this patent is extended or adjusted under 35 U.S.C. 154(b) by 303 days.

(21) Appl. No.: 15/630,258

(22) Filed: Jun. 22, 2017

(65) Prior Publication Data

US 2017/0374024 A1 Dec. 28, 2017

Related U.S. Application Data

(60) Provisional application No. 62/353,272, filed on Jun. 22, 2016.

(51) Int. Cl.
| | |
|---|---|
| *G06F 15/16* | (2006.01) |
| *H04L 29/12* | (2006.01) |
| *G06F 16/22* | (2019.01) |
| *G06F 16/955* | (2019.01) |

(52) U.S. Cl.
CPC .......... *H04L 61/3015* (2013.01); *G06F 16/22* (2019.01); *G06F 16/955* (2019.01); *H04L 61/1511* (2013.01); *H04L 61/302* (2013.01); *H04L 61/3025* (2013.01)

(58) Field of Classification Search
CPC .... G06F 16/22; G06F 16/955; H04L 61/1511; H04L 61/3025
See application file for complete search history.

(56) References Cited

U.S. PATENT DOCUMENTS

| | | | | |
|---|---|---|---|---|
| 6,338,082 B1* | 1/2002 | Schneider | ......... | H04L 29/12594 709/203 |
| 6,895,430 B1* | 5/2005 | Schneider | ......... | H04L 29/12009 707/999.005 |
| 7,042,335 B2* | 5/2006 | Franks | ................. | G06Q 10/087 340/5.8 |
| 7,188,138 B1* | 3/2007 | Schneider | .............. | G06Q 30/02 709/203 |

(Continued)

OTHER PUBLICATIONS

.ART Domain is a Time Capsule for Today's Creatives, https://blog.101domain.com/domains/art-domain-time-capsule-creatives. (Year: 1999).*

(Continued)

*Primary Examiner* — Ario Etienne  
*Assistant Examiner* — Thorne E Waugh  
(74) *Attorney, Agent, or Firm* — Nixon Peabody LLP

(57) ABSTRACT

Presented herein are methods, non-transitory computer readable media, and devices for providing and managing a Top-Level Domain that uniquely identifies an object or a role The method may comprise linking the domain name with an object (e.g., an artwork) by adding approximately eight additional fields to the domain name "Whois" record. "Whatis" (the combination of existing "Whois" and a number of additional fields) directly links the domain name, the registrant, and an (art) object. Any or all of the additional fields can be employed in many varieties of ways as a link and identification with objects or roles, transferring with the ownership of an object or, say, title or position of a role.

16 Claims, 2 Drawing Sheets

(56) References Cited

U.S. PATENT DOCUMENTS

| | | | |
|---|---|---|---|
| 7,194,552 B1* | 3/2007 | Schneider | H04L 29/12594 709/217 |
| 7,797,413 B2* | 9/2010 | Adelman | G06Q 10/107 709/223 |
| 9,747,378 B1* | 8/2017 | Mohan | G06F 16/00 |
| 2006/0069697 A1* | 3/2006 | Shraim | H04L 63/1425 |
| 2006/0218303 A1* | 9/2006 | Adelman | H04L 29/12047 709/245 |
| 2009/0254545 A1* | 10/2009 | Fisken | G06Q 30/02 |
| 2010/0042622 A1* | 2/2010 | Matkowsky | H04L 29/12594 707/769 |
| 2010/0106650 A1* | 4/2010 | Adelman | G06Q 50/188 705/80 |
| 2013/0085932 A1* | 4/2013 | Waldron | H04L 61/1511 705/40 |
| 2013/0173497 A1* | 7/2013 | Gould | H04L 61/302 705/400 |
| 2014/0006642 A1* | 1/2014 | Kothapalli | G06F 16/245 709/245 |
| 2015/0302053 A1* | 10/2015 | Mitnick | H04L 61/302 707/755 |
| 2016/0055490 A1* | 2/2016 | Keren | G06Q 30/00 705/14.47 |
| 2016/0179769 A1* | 6/2016 | Gershom | G06F 16/958 715/235 |
| 2017/0195286 A1* | 7/2017 | Stahura | H04L 61/3015 |
| 2017/0279762 A1* | 9/2017 | Fregly | H04W 12/02 |

OTHER PUBLICATIONS

WHATIS™ and Digital Twin, https://art.art/blog/whatis-art-records/. (Year: 2019).*

* cited by examiner

DOMAIN NAME REGISTRY DATABASE

TECHNICAL FIELD

The present disclosure relates generally to information registering, searching, retrieval, and modification in database systems, and more specifically, relates to a method for operating a generic Top-Level Domain that uniquely identifies an object or a role.

BACKGROUND

The Domain Name System originated with the implementation of Advanced Research Projects Agency Network (ARPANET). The Domain Name System enabled individual computers to be identified uniquely for the purpose of transmitting and receiving data over a wide area network. The Domain Name System contains information that allows each computer to be uniquely identified. Each computer on the network is assigned an address, which is known as an Internet Protocol Address (IP Address). Each computer's IP Address consists of a unique string of digits. A domain name consists of a unique string of characters. The Domain Name System maps each unique domain name to its unique IP Address. Domain names consist of two parts: an initial string of alphameric characters followed by a period (commonly known as "dot") and by a second string of alphameric characters. The second string of characters is known as a Top-Level Domain. The Domain Name System recognizes only Top-Level Domains that have been specified by international convention. Some of the most commonly used Top-Level Domains are "com," "net," and "org." The first string of characters followed by the dot and then followed by the Top-Level Domain is known as a Second-Level Domain (SLD).

Domains exist at various different levels within the Domain Name System hierarchy. For example, a generic Top-Level Domain (gTLD), such as .com or .net, is a domain at the highest level in the Domain Name System hierarchy. Another type of Top-Level Domain is a country-code Top-Level Domain (ccTLD) such as, for example, ".uk." A second-level domain (SLD) is a subdomain of a Top-Level Domain (including gTLD and ccTLD), which is directly below the Top-Level Domain in the Domain Name System hierarchy. For example, "com" is the Top-Level Domain and "example" is the SLD for the domain name "www.example.com." An "n-level" domain can indicate any level of domain, including top-level, second-level, etc.

In addition to the traditional Top-Level Domains (e.g., .COM and .NET), the domain name system and domain name registration system have also evolved to allow the use of new generic Top-Level Domains, which may be applied for from the regulatory body pertaining to registries and registrars, the Internet Corporation for Assigned Names and Numbers (ICANN). Some of these generic Top-Level Domains are often referred to as "vanity" or "brand" domains, such as .MICROSOFT or .COCACOLA. ICANN also allows for "community-based" TLDs, such as .BANK or .HOTEL, and "geographic" TLDs, such as .AFRICA. Other TLDs may be contemplated by ICANN.

The creation and administration of a new Top-Level Domain requires several changes to be made at a registry, at one or more registrars, and at a variety of other services, such as Whois. The Whois server typically stores and provides domain registration information, such as registration date, expiration date, status, and owner of the registered domain names. The Whois server provides a service that can be queried by users via, for example, a website on the Internet provided by a registrar or registry or via standard Telnet-like clients. With ICANN's new generic Top-Level Domain program for new generic Top-Level Domains, hundreds of new generic Top-Level Domains are expected to be created over the next few years. However, all new Top-Level Domains are restricted to the confines and parameters of the typical Whois Server.

Figures 1, 2:
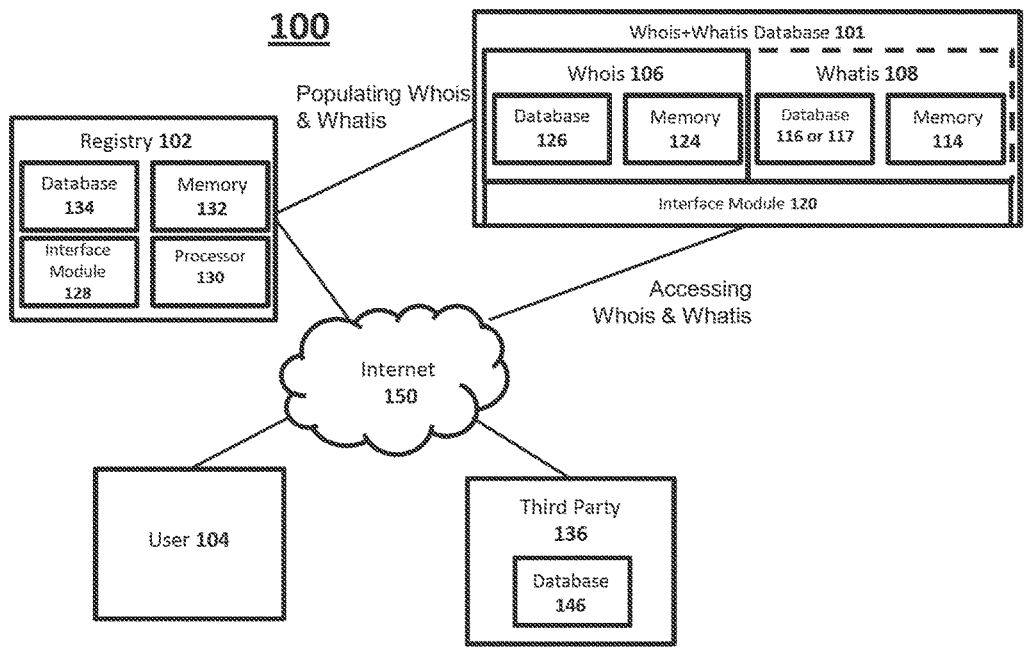
FIG. 1 is a schematic block diagram of an exemplary system for registering a generic Top-Level Domain that uniquely identifies an object or a role with a certain set of permissions.
FIG. 2 is a schematic block diagram for an exemplary Whois server for linking the domain name with an object in accordance with an illustrative embodiment of the present disclosure.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for providing and managing a Top-Level Domain that uniquely identifies an object or a role with a certain set of permissions. As used herein, the term ".ART" generally refers to an exemplary embodiment of a Top-Level Domain identifier. Furthermore, the Second-Level Domain represents the object or role. In other words, as the object transfers ownership, so will the domain name. The domain name is a unique identifier and, in the case of .ART for example, is identified with a unique piece of artwork or art-related role. The domain name provides a form of provenance, authentication and other valuable sources of information regarding an individual artwork or personal details that will increase the value and trustworthiness of the piece or the association with the role. Whois and zone file data can be used to trace and establish ownership and history. While artwork can be replicated; a domain name is always clearly unique.

In an embodiment, a method for providing and managing a Top-Level Domain that uniquely identifies an object or a role with a certain set of permissions is provided. The method may comprise linking the domain name with an object (e.g., an artwork) by adding approximately eight additional fields to the domain name "Whois" record. The "Whatis" (the number of additional fields that are added to the existing, required Whois data fields) directly links the domain name, the registrant, and an (art) object. In some embodiments, the "Whatis" record can be referred to as the "Art Record." Any or all of the additional fields can be employed in many varieties of ways as a link and an identification with objects or roles, transferring with the ownership of an object or, say, title or position of a role. In an exemplary embodiment, new Whois fields are introduced. These fields may include an object flag (yes or no), artist name, artwork title, creation date, medium, and artwork dimensions. Other fields may be included. In other embodiments, such as for example, vintage automobiles, persons of title, some or all of the fields can be employed as determined by the users of this new tool. The additional Whois fields are determined in order to establish artwork provenance. The new Whois fields will comprise "Art Records" or "Whatis".

FIG. 1 illustrates a diagram providing an example of a system 100 for serving a new top-level domain (TLD), consistent with the disclosed embodiments. In this example, a registry 102, a user 104, a Whois server 106, and a third-party 136 may be connected to a network, such as Internet 150. In certain embodiments, the network may be any type of communication network configured to transmit information between the devices of system 100. For example, the network may include a wireless and/or wireline network components (e.g., hardware, software, and/or firmware) configured to receive, route, translate, and deliver information. The network may also include an extranet, an Intranet, a Local Area Network, etc. and infrastructure that communicates information over these types of networks, such as wireless/wireline base stations, transceivers, and related technology.

Registry 102 may be an entity that manages a new TLD. Registry 102 may include infrastructure to define and provision new TLDs, including, for example, computer components (e.g., servers, processors, memory devices storing software instructions that when executed by processor(s) execute provisioning-related processes, communication components, and the like). Registry 102 may include one or more processors 130 and memory devices (memory) 132 storing software instructions that, when executed by processors 130, perform one or more operations consistent with the disclosed embodiments. Registry 102 may include an interface module 128, such as a graphical user interface, to allow registry 102 to manage TLDs. Registry 102 may also include Database 134 used to store the managed TLDs.

Whois server 106 may provide a service accessible by registry 102 for responding to Whois queries. Whois server 106 may be one or more computers configured to receive requests for information over a network (e.g., Internet 150) and provide information to components over the network. For example, in one embodiment, Whois server 106 may include one or more computer or data processing devices that have hardware (e.g., processors, storage memory, data buses, network interface, etc.) and/or software (e.g., application programs, operating systems, other executable program code written in any known programming languages). Whois server 106 may include one or more processors 122 and memory devices (memory) 124 storing software instructions that, when executed by processors 122, perform one or more operations consistent with the disclosed embodiments. Whois server 106 may include an interface module 120, such as a web interface, to allow registry 102, user 104, or third party 136 to query for information relating to the TLDs that Whois server 106 serves. Whois server 106 may also include one or more databases 126 for storing information relating to TLDs.

In one embodiment, Whois server 106 may be associated with registry 102. For example, Whois server 106 may be associated with a Whois service provider that provides the service for registry 102. In another embodiment, Whois service 106 may be part of registry 102. In other embodiments, Whois server 106 may provide Whois services for multiple entities that manage TLDs, including registry 102 and third party 136. For example, third party 136 may be a corporation, partnership, company, or other business entity that manages a new gTLD, such as .MICROSOFT.

User 104 may be an individual accessing Whois server 106 via, for example, a website on the Internet 150 or via Whois server 106's interface 120. Alternatively, user 104 may be a registrar or other corporation, partnership, company, government agency, municipality, or other forms of business or government entities that accesses Whois server 106. System 100, or one or more components of system 100, may be configured to execute processes that provide Whois services relating to TLDs defined and provisioned by registry 102.

FIG. 2 illustrates a diagram for an exemplary Whois server database 126 for linking the domain name with an object (e.g., an artwork) by adding additional fields to the domain name "Whois" record, consistent with the disclosed embodiments. Each field may be associated with a TLD, where the TLD .ART is a preferred embodiment provisioned by registry 102. In an exemplary embodiment, the new Whois fields will comprise Whatis Database 127. These fields may include object flag (yes or no), artist name, artwork title, creation date, medium, and artwork dimensions. Other fields may be included. In other embodiments, such as for example, vintage automobiles, persons of title, some or all of the fields can be employed as determined by the users of this new tool. The field content and format may be based on standards promulgated by pertinent industry-standards bodies. The additional Whois fields are determined in order to establish artwork provenance. Additional fields, may be included. Examples of the data fields may include the Artist name in the following format: First (underscore)Middle(underscore) LAST). Further, data fields may include the artwork medium represented by, for example, a pull down menu that includes the choice of "other" plus a free field. The data fields may also include the date the artwork was created, represented by pull down menus with date, month and year. Furthermore, the date the artwork was created may be represented by a "circa" option or an equivalent. The data fields may also include the artwork dimensions. The artwork dimensions may be represented, for example, in the following format: NNN×NNN in cm for paintings; NNN×NNN×NNN in cm for three-dimensional work (Horiz×Vert×Depth). Because the Whois database 126 contains object specific identifiers, the domain name is a transferrable asset, whereas the website URL is not. The domain name may be licensed or sold. For example, third party applications using object identifier.art data may view and/or transfer the objects via mobile application, gallery software, auction software, virtual reality software embedded on mobile devices, tablets, desktops, laptops and display devices at user 104.

Figure 3:
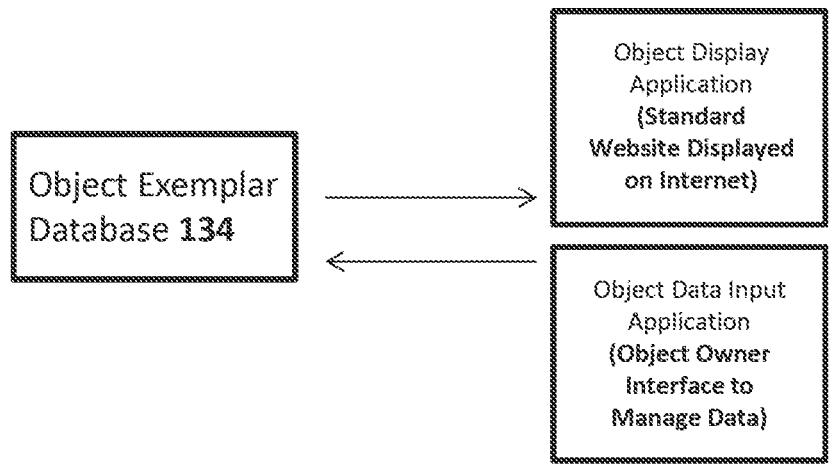
FIG. 3 is a schematic block diagram of an exemplary registry database for providing and managing a domain name based on the data fields provided with respect to the Whois server in accordance with an illustrative embodiment of the present disclosure.
Figure 3:
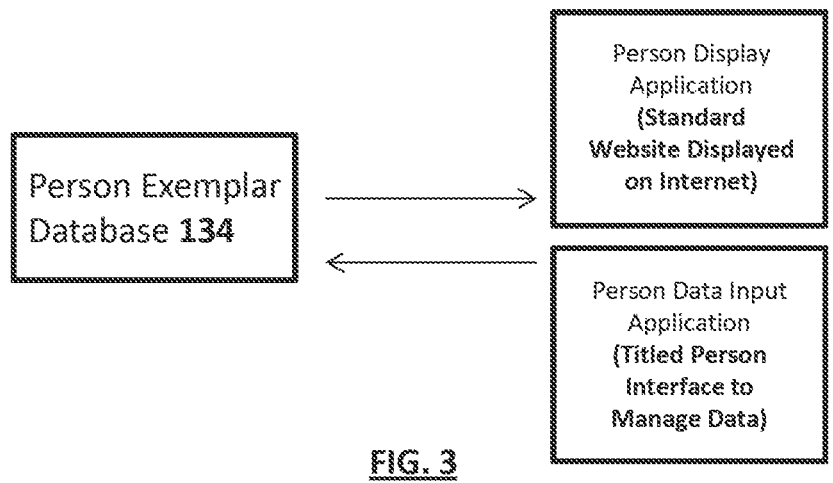

FIG. 3 is a schematic block diagram of a registry database 134 for providing and managing a domain name based on the data fields provided with respect to the Whois server 106. Registry database 134 can provide access through a secure connection to the user 104, where the user can view the object on a standard website displayed on the internet. Furthermore, the registry database 134 can receive electronic frame data input from the object owner at the registry interface module 128. Through the registry interface module 128 the owner can manage data associated with the domain name through a secure connection. In an exemplary embodiment, the domain name will start with the acronym "obj" or "http://obj--", where "obj" indicates an "Art Record". Alternatively, the Art Record database might be comprised of as third-level names, for example: http://obj--.artrecords.art. The domain name may be based on a combination of numerical expressions (e.g., algorithm) of the new Whois data points that are entered; for example: the artist's name, the artwork title, the date the artwork was created, the artwork medium and the dimensions of the artwork. A domain name of the artwork owner's choosing can also identify and be linked with the work of art. For example, authoritative oversight organizations, as well as commercial organizations have developed standard formats for certified artwork registered in their repository. If artsy.com or other registration repositories wish to join the .ART scheme, they might be reticent to give up their identifying naming convention. Even without an existing nomenclature, the artwork owner might desire an intuitive name for her/his artwork. After all, .ART provides more intuitive, memorable names.

Both types of names should be used. Each piece of artwork may employ a "obj--.ART" name as the primary, unique identifier. In addition, the artwork may also be linked to and identified with a more intuitive domain name. The owner can purchase the obj--.ART name and, as an option, also purchase a second .ART name of her/his choosing. Or the owner might continue to designate an Artsy or other identifier to which the owner has the rights. In this later case, the owner may provide .ART with the second domain name and the obj--.ART or the obj--.artrecord.art name will redirect to it.

The database 134 may also include public, private or proxy registration for the domain name. In a present embodiment, domain name registrants are obligated to include their name and contact information into the Whois database. Some artwork owners may prefer for that information to be public. For example, museums might choose to can publicly identify themselves through Whois. Other artwork owners prefer privacy, not revealing their home address or name. Therefore, the Art Record repository can offer three types of registration: public, private and proxy. In a public registration, all Whois/Whatis information is public. In the private registration, the registrant name is visible but the registrar, which furnishes the registrar's contact information, masks the address. In the proxy registration, an agent registrant masks all of the registrant's information. This includes the registrar and its name and contact information. In this case, .ART can specify its own agent proxy registrant.

Figure 4:
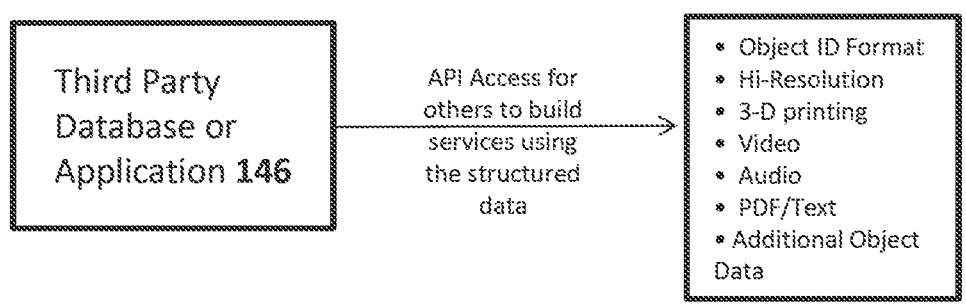
FIG. 4 is a schematic block diagram of an exemplary third party database for providing API access for a third party to create services using the structured data in accordance with an illustrative embodiment of the present disclosure.

FIG. 4 is a schematic block diagram of a third party database 146 for providing application programming interface (API) access for a third party to create services using the structured data in the present disclosure. An API may comprise a service made available to third parties, which may further comprise any individual, entity, system, hardware, or software wishing to access the disclosed information and functionality. Such an API may comprise a software-to-software interface that specifies the protocol defining how independent computer programs interact or communicate with each other. It also may comprise a collection of pre-configured building blocks allowing a third party to easily configure their software for compatibility and/or extensibility. The API may allow a requesting party's software to communicate and interact with the software application and/or its provider—perhaps over a network—through a series of function calls (requests for services). It may comprise an interface provided by the software application and/or its provider to support function calls made of the software application by other computer programs. As shown in FIG. 4, the third party database 146 may allow access to the object data. In addition, the third party database 146 may allow third parties to write information as well to store for the Art Record. Once the third party obtains permission it will be able to store object-related information in the database.

Embodiments of the present disclosure include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the techniques introduced here may be provided as a computer program product, which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting the scope of the disclosure, which is defined by the claims.

What is claimed:

1. A method for providing and managing a Top-Level Domain that identifies an object, the method comprising:
   receiving a first domain name associated with a first object;
   generating a "Whois" record associated with the received first domain name, the "Whois" record including a plurality of fields associated with the first domain name, the plurality of fields consisting of registration data required for creating the first domain name; and expanding the "Whois" record by adding one or more new fields associated with the first object to the "Whois" record, thereby linking the first domain name with the first object, wherein the one or more new fields comprises provenance information and metadata regarding the first object associated with the first domain name, the first object being able to be viewed on a website associated with the first domain name.

2. The method of claim 1, wherein the first object associated with the first domain name comprises a certain set of permissions associated with the first domain name, and the method further comprises storing the one or more new fields in a registry according to the certain set of permissions.

3. The method of claim 1, wherein the one or more new fields includes an ownership of the first object, whereby transference of the first domain name is indicative of transference of ownership of the first object.

4. The method of claim 1, wherein the one or more new fields further includes a title and a position of a role associated with an ownership of the first object, whereby transference of the first domain name is indicative of transference of at least one of the role, the title, and the position of a person holding the role.

5. The method of claim 1, wherein the one or more new fields of the "Whois" record comprises an artist name, an artwork title, a creation date, a medium, and artwork dimensions.

6. The method of claim 1, further comprising:
receiving a request, from a third party, to access a registry storing the "Whois" record associated with the first object of the first domain name; and
sending the stored "Whois" record to the third party, the "Whois" record including the registration data and data from the one or more new fields.

7. The method of claim 1, wherein the one or more new fields further comprises an "Art Record".

8. The method of claim 1, wherein the registration data of the "Whois" record includes a plurality of object specific identifiers, the plurality of object specific identifiers comprising the first domain name associated with the first object and a website URL; wherein the first domain name is transferable; and wherein the website URL is not transferable.

9. A non-transitory computer readable medium having stored thereon instructions for performing a method for providing and managing a Top-Level Domain (TLD) that identifies an object, the non-transitory computer readable medium comprising machine executable code which when executed by at least one machine, causes the machine to:

receive a first domain name associated with a first object;
generate a "Whois" record associated with the received first domain name, the "Whois" record including a plurality of fields associated with the first domain name, the plurality of fields consisting of registration data required for creating the first domain name; and
expand the "Whois" record by adding one or more new fields associated with the first object to the "Whois" record, thereby linking the first domain name with the first object, wherein the one or more new fields comprises provenance information and metadata regarding the first object associated with the first domain name, the first object being able to be viewed on a website associated with the first domain name.

10. The non-transitory computer readable medium of claim 9, wherein the first object associated with the first domain name comprises a certain set of permissions associated with the first domain name, and the machine is further caused to store the one or more new fields in a registry according to the certain set of permissions.

11. The non-transitory computer readable medium of claim 9, wherein the one or more new fields includes an ownership of the first object, whereby transference of the first domain name is indicative of transference of ownership of the first object.

12. The non-transitory computer readable medium of claim 9, wherein the association with the first object comprises a link and identification with a role with a certain set of permissions, whereby transference of the domain name comprises transference of at least one of title and position of the role.

13. The non-transitory computer readable medium of claim 9, wherein the one or more new fields of the "Whois" record comprises an artist name, an artwork title, a creation date, a medium, and artwork dimensions.

14. The non-transitory computer readable medium of claim 9, wherein the machine is further configured to:
receive a request, from a third party, to access a registry storing the "Whois" record associated with the first object of the first domain name; and
send the stored "Whois" record to the third party, the "Whois" record including the registration data and data from the one or more new fields.

15. The non-transitory computer readable medium of claim 9, wherein the one or more new fields further comprises an "Art Record".

16. The non-transitory computer readable medium of claim 9, wherein the one or more new fields of the "Whois" record comprises an artist name, an artwork title, and a creation date.

\* \* \* \* \*